United States Patent [19]

Westley

[11] Patent Number: 4,465,327

[45] Date of Patent: Aug. 14, 1984

[54] ARTICLE STORAGE AND RETRIEVAL ASSEMBLY

[76] Inventor: Martin J. Westley, 2964 N. Fulton Dr. NE. #8, Atlanta, Ga. 30305

[21] Appl. No.: 353,982

[22] Filed: Mar. 8, 1982

[51] Int. Cl.$^3$ .............................................. A21B 81/06
[52] U.S. Cl. ....................................... 312/11; 312/97; 312/268; 206/387
[58] Field of Search ...................................... 312/9–14, 312/267, 268, 97, 97.1, 186; 206/387

[56] References Cited

U.S. PATENT DOCUMENTS

| | | | |
|---|---|---|---|
| 2,773,727 | 12/1956 | Bradley | 312/10 |
| 3,442,564 | 5/1969 | Gutting | 312/268 |
| 4,057,305 | 11/1977 | Zdeblick | 206/387 X |
| 4,119,200 | 10/1978 | Cassidy et al. | 312/12 X |
| 4,285,557 | 8/1981 | Paladino et al. | 312/13 |
| 4,330,161 | 5/1982 | Khawand | 312/9 |

FOREIGN PATENT DOCUMENTS 2054355  2/1981  United Kingdom ................. 312/12

Primary Examiner—James T. McCall
Assistant Examiner—Joseph Falk
Attorney, Agent, or Firm—Newton, Hopkins & Ormsby

[57] ABSTRACT

Successive, juxtaposed, outwardly extending, receiving cradles are arranged in a continuous belt by having at their proximal ends, link like bases which are connected together hingedly in tandem by their leading and trailing edges which form hinge members. Opposed wedged shaped, sidewise protruding trunnions extend from the proximal end plates of each cradle and these trunnions are received within laterally opposed, linear channels in the upstanding side panels of a support member. The channels thus confine the wedge shaped trunnions to form adjacent parallel upper and lower flights so that the cradles protrude upwardly generally parallel to each other in the upper flight and downwardly generally parallel to each other in the lower flight. The ends of the channels are sufficiently wide to accomodate the pivoting of the wedge shaped trunnions which permit the cradles to be advanced manually by the movement of an upper outer cradle in an arcuate path from the upper flight to the lower flight or movement of the lower outer cradle in an arcuate path from the lower to the upper flight. The wedge shaped trunnions form ratchets which restrict advancing the support member to one direction. Lugs on the cradles form hangers by which the cassette is retained in its cradle and the cassette cannot be removed except at the end of the flight.

13 Claims, 6 Drawing Figures

ARTICLE STORAGE AND RETRIEVAL ASSEMBLY

BACKGROUND OF THE INVENTION

This invention relates to a storage assembly and is more particularly concerned with an article storage and retrieval assembly particularly suited to store cassettes.

DESCRIPTION OF THE PRIOR ART

In the past rotary carousels have been devised for receiving and holding cassettes and other items to be temporarily stored and retrieved. Such rotary carousels have moved in a continuous path. U.S. Pat. Nos. 4,221,440; 4,057,305; 3,963,287 and 3,765,738 are typical of these rotary carousels. Also, various cabinets for cylindrical records have been devised in which the individual records were carried on flexible or articulated bands for movement in a continuous path. U.S. Pat. Nos. 1,374,462; 1,008,823; 1,100,401; 914,078 and 705,009 show these various cabinets. U.S. Pat. Nos. 2,984,530 and 919,927 show similar arrangements which are not related to record holders. All of these patents utilize drums, pulleys or sprockets around which the joined holders are moved.

SUMMARY OF THE INVENTION

Briefly described, the present invention includes a storage assembly formed of a support member and a carousel carrier the latter having a plurality of molded plastic cradles which are adapted to receive various cassettes or housings which carry magnetic tape sound recordings or other software.

Each cradle at its proximal end has a pair of flat rectangular bottom plates or bases, the forward edges of which are connected to the rear edge of the next adjacent cradles by hinge members so as to produce a pair of spaced opposed belts which are flexible between the adjacent link like bottom plates or bases of the cradles. In the preferred embodiment, each cradle has a flat back strap which join the outer ends of end plates and has tines which carry the cassette. The cradle also has opposed rectangular end plates from the proximal ends of which protrude the wedge shaped trunions which ride within opposed linear horizontal channels in the upstanding side panels of a support member. The channels support the wedge shaped trunnions of the lower flight which protrude sidewise into the channel so as to guide them along a linear path and the trunnions of the upper flight are received on the lower trunions in ratchet fashion to retard rearward movement of the cradles. The hinge elements form pivot means by which an endmost link element can be pivoted from one flight to the other, so as to advance the belt of cradles.

Accordingly, it is an object of the present invention to provide a storage assembly which is inexpensive to manufacture, durable in structure and efficient in operation.

Another object of the present invention is to provide a storage assembly which is particularly suitable for storing a plurality of magnetic tape cassette housings, for selective removal therefrom.

Another object of the present invention is to provide a storage assembly which can be readily molded and which has few moving parts.

Another object of the present invention is to provide a storage assembly which is capable of storing the cassettes or other containers or housings and will automatically preclude their removal except for the endmost containers.

Another object of the present invention is to provide a storage assembly for cassette housing which will allow for the quick, visual identification of a housing by inspecting the face of the container, itself.

Another object of the present invention is to provide a storage assembly which will easily store and permit the rapid retrieval of a particular container, in a minimum amount of space.

Another object of the present invention is to provide a storage assembly which will hold the cassette housing by the tape spline/reel firmly to prevent tape damage due to unravelling.

Another object of the present invention is to provide a cassette storage assembly which will protect the exposed portion of the tape in the cassette and prevent damage or the accumulation of dust from the environment without the necessity of the tape being stored in a box prior to its being received.

Another object of the present invention is to provide a storage device which can be readily disposed on and utilized on a table top.

Another object of the present invention is to provide a storage assembly which can be carried in an automobile and which will hold the cassettes stored within the device, regardless of the vibration in the automobile.

Another object of the present invention is to provide a tape storage assembly which can be readily molded from inexpensive plastic material, such as polyethylene and which is very durable and essentially fool proof.

Other objects, features and advantages of the present invention will become apparent from the following description when taken in conjunction with the accompanying drawings wherein like characters of reference designate corresponding parts throughout the several views.

DESCRIPTION OF THE PREFERRED EMBODIMENTS

Figure 1:
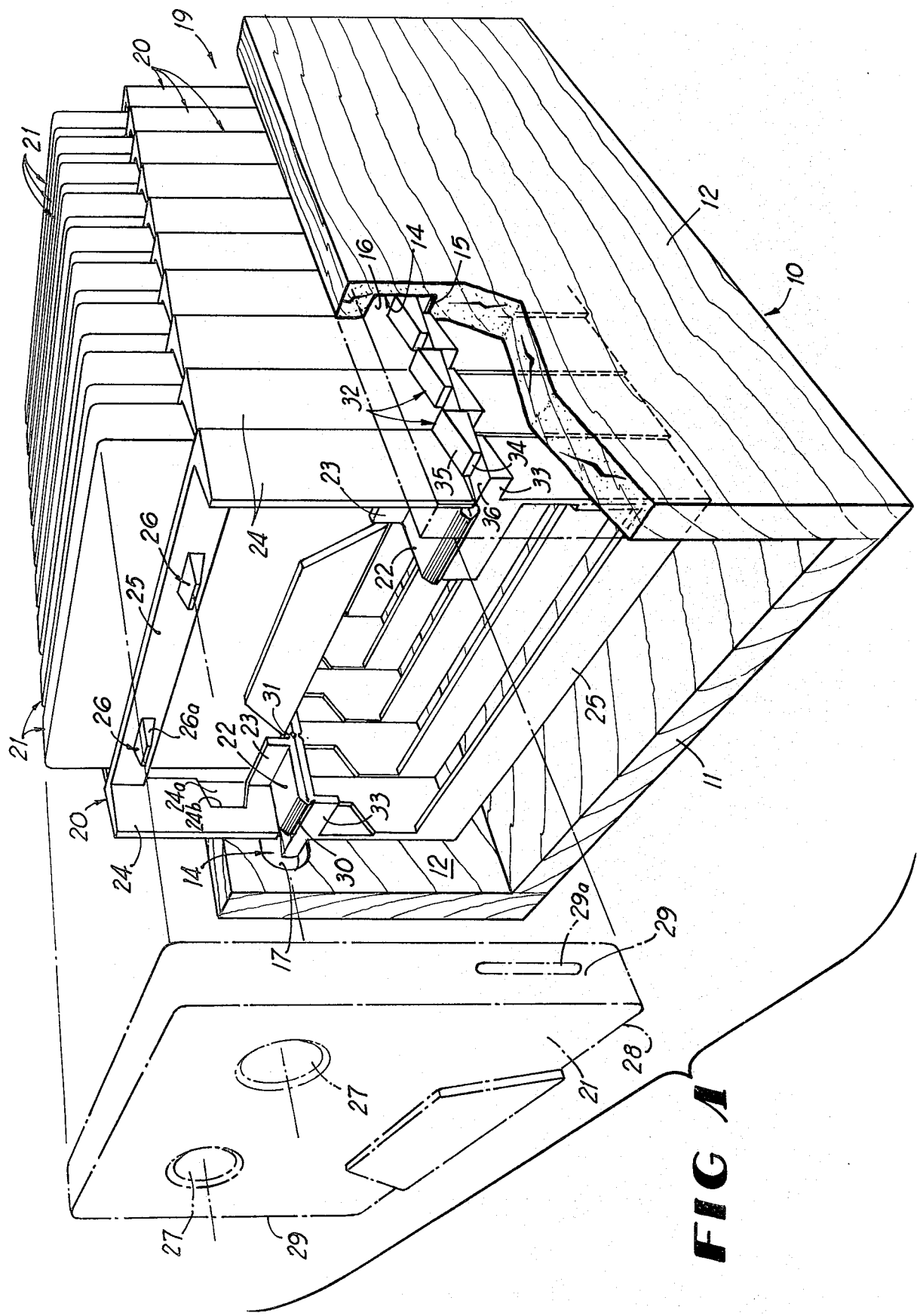
FIG. 1 is a perspective view of an article storage and retrieval assembly constructed in accordance with the present invention, the cassette housing being illustrated in full lines and a certain one in broken lines for being received in the forwardmost cradle shown therein.
Figure 2:
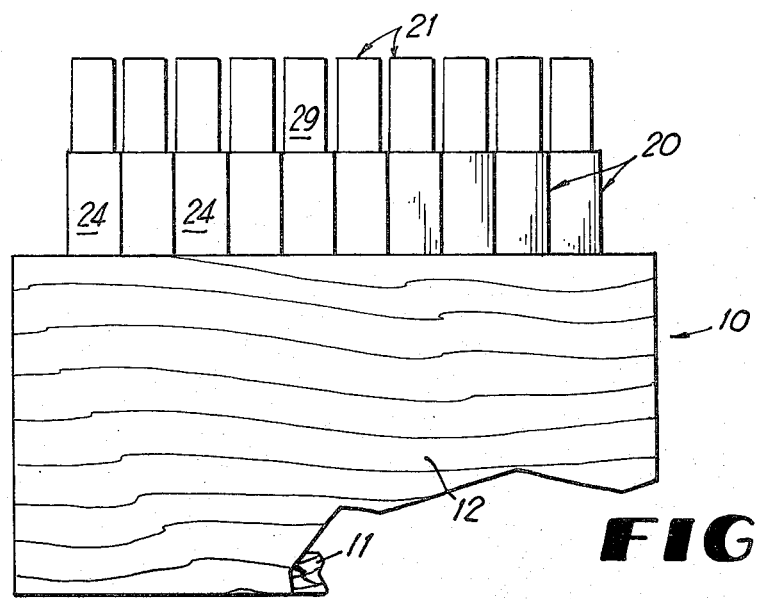
FIG. 2 is a side elevational view of the assembly shown in FIG. 1.
Figure 3:
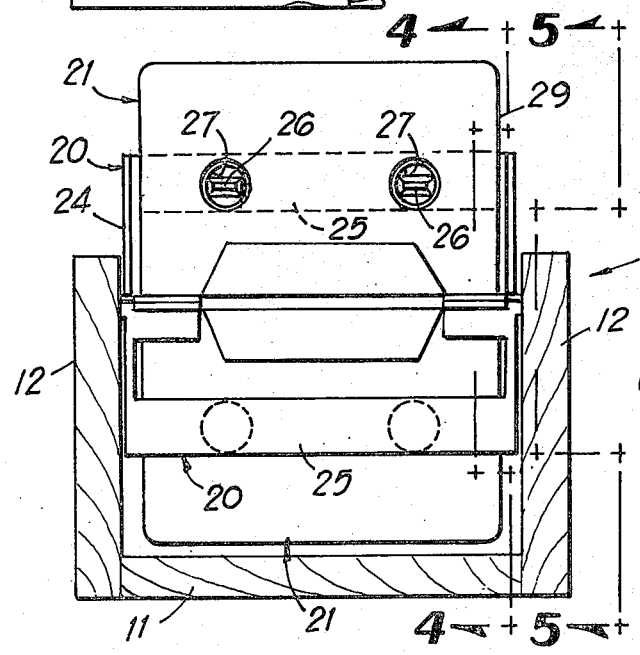
FIG. 3 is an end view of the assembly shown in FIGS. 1 and 2.
Figure 4:
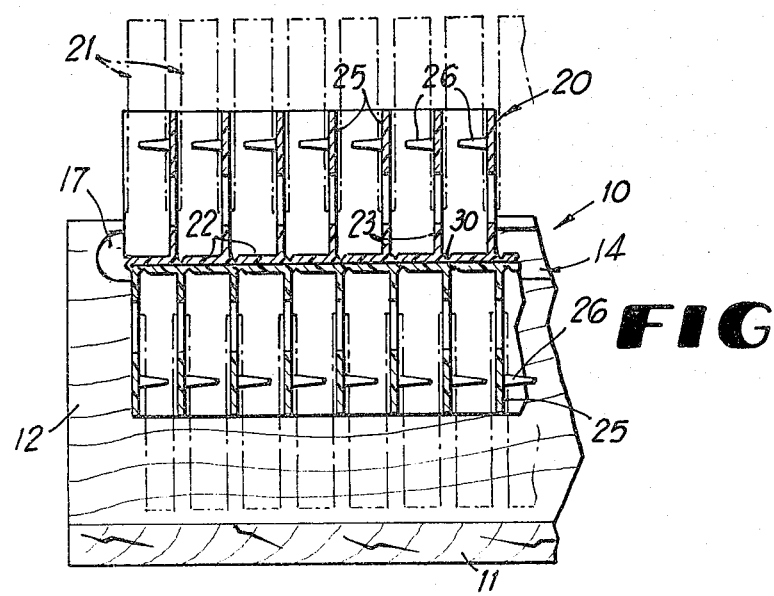
FIG. 4 is a cross sectional view taken substantially along line 4—4 in FIG. 3.

Referring now in detail to the embodiment chosen for the purpose of illustrating the present invention, it being understood that under its broader aspects, the present invention is not limited to the exact details herein depicted, numeral 10 denotes generally a support member having a flat rectangular base 11 and a pair of flat upstanding spaced, parallel side panels 12, the side panels 12 extending from opposite sides of the base 11. Thus, is provided a channel shaped member which forms the support for the continuous moveable carousel article carrier 19. The sides panels 12 are provided with opposed, linear, complimentary, horizontally disposed channels or recesses 14, the ends of which are closed. In more detail, each channel 14 is defined by a flat horizontally disposed lower ledge 15 and a flat horizontally disposed upper ledge 15. The ledges 15 and 16 being parallel and vertically spaced apart, their ends being joined by concaved, semicircular opposed end wall 17 which merge at the bottom with the ends of ledge 15 and at the top with the ends of ledge 16. The opposed ledges 15 are in horizontal alignment with each other and the opposed ledges 16 are in horizontal alignment with each other, the plane of ledges 15 being parallel to the plane of ledges 16 and also being parallel to the base 11. The walls 17 terminate inwardly of the ends of the panels 12.

Referring to the carrier 19, this carrier forms a storage member made up of a plurality of juxtaposed cradles 20, each cradle 20 being capable of receiving a cassette i.e., a cassette housing 21, as will be explained hereinafter.

Each cradle 20 includes a pair of spaced, opposed, parallel, flat, rectangular, link-like, essentially rigid, bottom plates or bases 22, the rear ends of which are provided with upstanding back flanges 23 perpendicular to the base 22. The outer edges or ends of the bases 22 are provided with outwardly protruding, rectangular end plates 24, the outer rear end portions of which are joined by a rectangular back or back strap 25 which is aligned with the back flanges 23. The back strap 25 carries a pair of generally horizontally extending detent means, such as retaining lugs or tines 26 which protrude generally sidewise, i.e., forwardly, as seen in FIG. 1, so as to terminate between the plates 24.

It will be understood by those skilled in the art that a conventional magnetic tape cassette or housing 21 has a pair of tape spline/reels (not shown) which are driven, at times by spindles which protrude through holes or openings 27 in the cassette housing 21. The space between the lugs or tines 26 corresponds to the distance between the holes 27 and the distance vertically of the lugs 26 from the bases 22 is about equal to the distance from the holes 27 to the front face 28 of the cassette. The tines 26 are rectangular in cross-section and taper forwardly, being trapezoidal when viewed from the side so that, when the spools of the cassette 21 are received thereon, they will not rotate the teeth of the spool being frictionally wedged onto the tine.

The distance between the opposed, generally parallel, end plates 24 is slightly wider than the distance between the opposed sides 29 of the cassette housing 21. The end plates 24 are open along their central rear portions to provide laterally opposed end openings 24a which are arranged respectively to receive the opposed detents or protrusions 29a which extend outwardly from opposite sides of the conventional cassette housing 21. Thus, when the cassette is inserted into a cradle 20, the opposed end plates 24 are deflected outwardly by the protrusions 29a until the protrusions 29a are received in the openings 24a, behind the edges 24b defining the openings 24a. The inner surfaces of the sides 24 tapering rearwardly so that the cassette housing 21 can be inserted by horizontal movement into the cradle 20. When received by the cradle 20, the lugs 26 protrude respectively through the holes 27 and the end plates 24 snugly receive the sides 29 of the cassette while the bases 22 receive the outer edge portions of the face 28 of the cassette.

While I have selected to describe the carrier or cradle 20 with reference to a cassette or cassette housing 21, it will be understood that the same types of cradle 20 and tines 26 will serve to hold eight track tape housings, video tape housing, ATARI games and similar cartridges. It will be understood that each of the cradles 20 is a molded polyethylene member and is connected by the front edges of the bases 22 hingedly to the rear edges of the bases 22 of the next adjacent carrier 20. Thus, there are a pair of forward and a pair of rear hinge members 30 along the forward and rear portions of the bases 22 formed by reduced thickness plastic areas and are capable of being reversely bent. The bases 22 form rigid links in a pair of opposed continuous chains or belts formed by the bases 22 and the hinge members 30.

Protruding sidewise from the outer surfaces of the side plates 24 are opposed pairs of wedge shaped trunnions 32. Each trunnion 32 is thus trapezoidal in cross section having a rear major base 33 and a forward minor base 34 which are parallel to each other, an upper or outer rectangular surface 35 and a lower or inner rectangular surface 36. These surfaces 35 and 36 are planar members which taper forwardly. The base 34 forms the forward end of each trunnion 32 and terminates rearwardly of the forward hinge 30 thereof. The rear base 33 is in a common plane with the rear surfaces of the flanges 23 of each carrier 20. Thus it is seen that when the wedges are received in the channels 14 they form upper and lower flights of wedges in which the bottom surfaces 36 of the upper flight rest on the top surfaces of the trunnions 32 in the lower flight.

There are an even number of cradles 20 in the continuous carousel belt. Thus, the top flight has the same number of bases 22 and of the same length as the lower flight. Also, each hinge member 30 can be bent through approximately 180°. Thus, each base 22 can make a U-turn at each end of the flights, and after making the turn the bases 22 of the upper flight rest in registry on the bases 22 of the lower flight.

Figure 5:
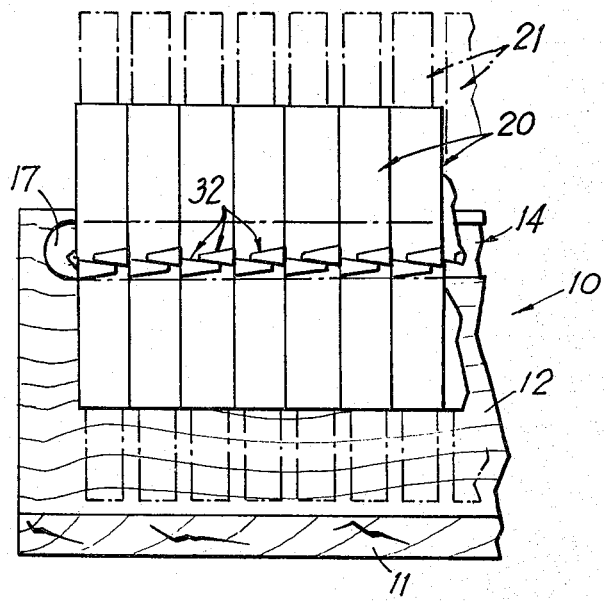
FIG. 5 is a cross sectional view taken substantially along line 5—5 in FIG. 3.

As best seen in FIGS. 1 and 5, the wedge shaped trunions of the upper flight have their major bases or rear bases 33 abutting the rear bases of the lower flights of trunnions 32 when the forwardmost upper cradle 24 is in a position to receive or permit the removal of the housing tape 21 as illustrated in FIG. 1.

Figure 6:
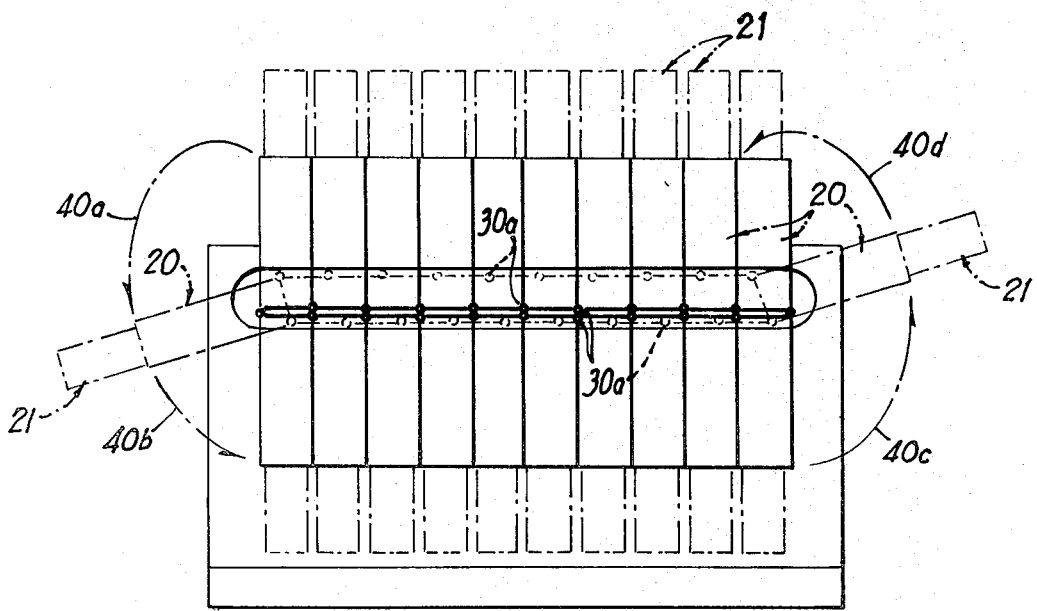
FIG. 6 is a schematic vertical sectional view of the assembly shown in FIGS. 1 through 5.

The width of the channels 14, particularly at their end portions, are such that, when it is desired to advance the carriers or cradles 20, the forwardmost cradle 20 can be pivoted in an arcuate path outwardly and downwardly, as depicted by arrows 40a and 40b. This enables the forwardmost cradle 20 to be pivoted about its forward hinge member 30 as its trunnions 32 pivot upwardly in an arcuate path and after the cradle 20 has been moved to approximately a horizontal position, slight further movement will urge it to its inverted vertical position in the lower flight, thereby advancing all cradles 20 one position. The operation can be repeated indefinitely. As the forwardmost cradle 20 is pivoted, the pulling of the belt formed by the hinged bases 22 will cause the rear lowermost cradle 20 to be pivoted upwardly to the upper flight as illustrated by arrows 40c and 40d. The pivot points 30a depicted in FIG. 6 are the points established by the hinge members 30 of each cradle 20. Therefore, the perimeter formed by the bases 22 does not change but rather forms generally progressively opening and then closing opposed parallelogram with the angle at the corners progressively changing as the leading cradle 20 is pivoted along the path indicated by arrows 40a and 40b. The parallelogram is not perfect since the angle at the corner of the manually moved cradle 20 will lead the angle of the remote cradle 20.

From the foregoing description the operation of the present device is apparent. The cradles 20 can only readily be rotated in a counterclockwise direction as viewed in FIG. 6, due to the fact that rear edge portions of the trunnions 32 in the upper and lower flights lock to resist clockwise movement. When an empty cradle 20 is arranged at its frontmost position, as illustrated in FIG. 1, the article, such as a cassette or cassette housing 21 may be moved into and out of that cradle. Such movement must be sidewise so as to insert the holes or openings 27 of the cassette housing 21 on to the lugs 26. Thereafter, the movement of that cradle in an arcuate path, as illustrated by arrows 40a and 40b will dispose the front of that cradle adjacent to the back of the frontmost bottom cradle, thereby confining the cassette housing 21 in place so that the lugs or tines 26 function as detents to prevent movement outwardly of the housings 21. Hence, only cassettes 21 from the upper forwardmost cradle 20 or the lower rearmost cradle 20 can be removed. The width of the channel 14 procludes inadvertant pivoting of the cradle 20 when it is an internal cradle of the upper or lower flight. Therefore there is no practical way of removing any cassette 21 until the cradle 20 reaches its forwardmost position on the top flight or its rearmost position on the bottom flight.

All cradle 20 are vertical in the upper flight and vertical in the lower flight and fit quite closely together. The flat surfaces of trunnions 32 assure that the cradles 20 remain so, except when being pivoted.

The cradles 20 can be readily molded from polyethylene so as to provide the flexible hinge members 30 and 31 for adjacent cradles 20. Indeed, the entire continuous carrier 19 may be formed of a single sheet and with the parts being pivoted and glued to form the continuous carrier 19.

It will be obvious to those skilled in the art that many variations may be made in the embodiments chosen for the purpose of illustrating the present invention without departing from the scope thereof as defined by the appended claims.

I claim:

1. A storage and retrieval assembly comprising:
    (a) a support member having a channel;
    (b) a carousel carrier carried by said support member, said carrier having a plurality of juxtaposed transversely disposed cradles having backs so that the front sides of the cradles are open and the back sides thereof are at least partially closed for receiving sidewise therein articles for temporary storage in the cradles, the proximal ends of said cradles including bases and hinge elements for hingedly connecting the front edge of one base to the rear edge of the next adjacent base for producing a continuous belt of such bases; and
    (c) means protruding into said channel from said cradles for controlling the path of travel of said continuous belt of said cradles and for forming said belt into an upper flight and a lower flight in which said cradles of said upper flight protrude upwardly from their bases and the cradles of said lower flight extending downwardly from their cradles and in which the back of one cradle is positioned sidewise over and closes the open front of the adjacent cradle in each flight, said channel at the ends of the flights being of sufficient dimensions to permit movement of any one of said means for permitting the endmost base of the respective flights to pivot simultaneously when such link is urged in an arcuate path so as to transfer such base from one flight to the other.

2. The assembly defined in claim 1 wherein said cradles are open at their outer ends, and forwardly projecting from said backs detent means within said cradles for removeably retaining articles in said cradles.

3. The cassette assembly defined in claim 2 wherein said cradles are shorter than the articles, whereby a portion of each article protrudes outwardly of their respective cradles.

4. The assembly defined in claim 1 wherein said articles are cassette housings and each of said cradles is open along one side thereof for receiving through such opening cassette housings which are to be carried by said cradles, and detent means for removeably retaining said housings in said cradles until such housings are removed sidewise therefrom, said cradles, inwardly of the endmost cradles, being sufficiently close together that an adjacent cradle on the open side of the next adjacent cradle will prevent the removal of the cassette housing from such adjacent cradle when such cradles are extending in the same direction.

5. The assembly defined in claim 4 wherein said articles are cassette housings and said cradles are open at their distal ends, said cassette housings protrude outwardly therefrom.

6. The assembly defined in claim 4 wherein said articles are cassette housings and said detent means includes a sidewise extending lug adapted to protrude through an opening in said cassette housing when said cassette housing is installed in said cradle each of said cradles being sufficiently close that when a cradle is in a prescribed flight and has the adjacent cradle adjacent to its side opening, the adjacent cradle will block the removal of said cassette housing from such cradle.

7. The assembly defined in claim 1 wherein said support member includes an upstanding panel, provided with said channel, said panel having a lower linear surface defining the lower portion of said channel and wherein said means includes trunnions protruding from the sides of said cradles into said channel.

8. The assembly defined in claim 7 wherein said trunnions have a flat surface which rides upon said lower linear surface.

9. The assembly defined in claim 7 wherein said trunnions are wedged shaped members spaced from each other, the wedge shaped members having rear surfaces so that when said cradles are in the upper flight, a portion of the rear surface of said cradles in said upper flight will engage a portion of the rear surfaces of said cradles in said lower flight for acting as ratchets to restrict movement of said trunnions, said wedge shaped members in said lower flight riding along said lower surface.

10. The assembly defined in claim 9 wherein said wedge shaped members respectively have forward ends which are rearwardly of the hinge connecting the base of its associated cradle with the base of the next forward adjacent cradle, each of said cradles pivoting about said forward portion of its associated wedge shaped member when the cradle is pivoted for pivoting the cradle from one flight to the other.

11. A storage anad retrieval assembly comprising, a support and a continuous carrier moveably carried by said support, said continuous carrier including a continuous belt formed of alternate hinge members and bases, said bases being joined along their edges by said hinge members and a plurality of juxtaposed cradles protruding outwardly from said belt, each of said cradles being carried by one of said bases and detent means extending from said back over said one of said bases, each of said cradles being open along a side opposite to said back for removeably receiving an article to be stored in said cradle and on said detent means through the open side, a portion of the travel of said belt being such that the back of an adjacent cradle is positioned over said open side sufficiently that it precludes removal of the article from the detent of its cradle during that portion of said travel, said back of an adjacent cradle being spaced from said open side for permitting removal of the article from said open side during another portion of said travel.

12. The assembly defined in claim 11 wherein said detent means includes a tine for being received in an opening of said article, when said article is installed in the cradle.

13. The assembly defined in claim 11 including opposed end plates mounted on said bottom plates and provided with opposed openings for receiving therein, outwardly protruding protrusions of the article which is received in the carrier.

* * * * *